(12) United States Patent
Shankar et al.

(10) Patent No.: US 7,274,698 B2
(45) Date of Patent: Sep. 25, 2007

(54) MULTILEVEL PARSER FOR CONDITIONAL FLOW DETECTION IN A NETWORK DEVICE

(75) Inventors: Laxman Shankar, San Jose, CA (US); Shekhar Ambe, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1139 days.

(21) Appl. No.: 10/234,267

(22) Filed: Sep. 5, 2002

(65) Prior Publication Data

US 2003/0174705 A1    Sep. 18, 2003

Related U.S. Application Data

(60) Provisional application No. 60/364,041, filed on Mar. 15, 2002.

(51) Int. Cl.
*H04L 12/56* (2006.01)
(52) U.S. Cl. ........................ 370/392; 370/401
(58) Field of Classification Search ................ 370/392, 370/395.31, 395.32, 401, 389
See application file for complete search history.

(56) References Cited

U.S. PATENT DOCUMENTS

| | | | |
|---|---|---|---|
| 5,390,173 A | 2/1995 | Spinney et al. | |
| 5,473,607 A | 12/1995 | Hausman et al. | |
| 5,574,910 A | 11/1996 | Bialkowski et al. | |
| 5,610,905 A | 3/1997 | Murthy et al. | |
| 5,696,899 A | 12/1997 | Kalwitz | |
| 5,898,687 A | 4/1999 | Harriman et al. | |
| 5,951,651 A | 9/1999 | Lakshman et al. | |
| 6,041,053 A | 3/2000 | Douceur et al. | |
| 6,173,384 B1 | 1/2001 | Weaver | |
| 6,259,699 B1 | 7/2001 | Opalka et al. | |
| 6,289,013 B1 | 9/2001 | Lakshman et al. | |
| 6,425,015 B1 | 7/2002 | Jennings et al. | |
| 6,691,218 B2 * | 2/2004 | Brown ...................... 711/216 |
| 6,725,216 B2 * | 4/2004 | Davis et al. .................. 707/3 |
| 6,772,409 B1 * | 8/2004 | Chawla et al. ............. 717/106 |
| 6,850,521 B1 * | 2/2005 | Kadambi et al. ........... 370/389 |
| 6,963,586 B2 * | 11/2005 | Henriksson et al. ........ 370/469 |
| 2005/0047411 A1 * | 3/2005 | Kadambi et al. ........... 370/389 |
| 2005/0122966 A1 * | 6/2005 | Bowes ....................... 370/360 |
| 2005/0232274 A1 * | 10/2005 | Kadambi et al. ........... 370/392 |

FOREIGN PATENT DOCUMENTS

| | | |
|---|---|---|
| EP | 0907300 | 4/1999 |
| FR | 2 741 466 | 5/1995 |
| WO | WO99/00948 | 1/1999 |
| WO | WO 00/56024 | 9/2000 |
| WO | WO 0056024 * | 9/2000 |
| WO | WO 0056024 A2 * | 9/2000 |
| WO | WO 01/37115 A2 | 5/2001 |

* cited by examiner

*Primary Examiner*—Ricky Q. Ngo
*Assistant Examiner*—Chandrahas Patel
(74) *Attorney, Agent, or Firm*—Squire, Sanders & Dempsey L.L.P.

(57) ABSTRACT

A process of filtering packet data in a network device is disclosed. A descriptor table is accessed to obtain a first descriptor and a first field is extracted from a packet based on the first descriptor. An action table is accessed based on a value of the first field of the packet. Then an action from the action table is executed when a valid bit from the action table for the action is set or an action from a miss action table is executed when a valid bit from the action table for the action is not set.

30 Claims, 4 Drawing Sheets

MULTILEVEL PARSER FOR CONDITIONAL FLOW DETECTION IN A NETWORK DEVICE

REFERENCE TO RELATED APPLICATIONS

This application claims priority of U.S. Provisional Patent Application Ser. No. 60/364,041, filed on Mar. 15, 2002. The contents of the provisional application are hereby incorporated by reference.

BACKGROUND OF THE INVENTION

1. Field of Invention

The present invention relates to network devices, including switches, routers and bridges, which allow for data to be routed and moved in computing networks. More specifically, the present invention provides for a multilevel parser for conditional flow detection for assisting in the flow of data in a network device and a network device having such a parser.

2. Description of Related Art

In computer networks, each element of the network performs functions that allow for the network as a whole to perform the tasks required of the network. One such type of element used in computer networks is referred to, generally, as a switch. Switches, as they relate to computer networking and to Ethernet, are hardware-based devices that control the flow of data packets or cells based upon destination address information, which is available in each packet or cell. A properly designed and implemented switch should be capable of receiving a packet and switching the packet to an appropriate output port at what is referred to wirespeed or linespeed, which is the maximum speed capability of the particular network.

Basic Ethernet wirespeed is up to 10 megabits per second, and Fast Ethernet is up to 100 megabits per second. Another type of Ethernet is referred to as 10 gigabit Ethernet, and is capable of transmitting data over a network at a rate of up to 10,000 megabits per second. As speed has increased, design constraints and design requirements have become more and more complex with respect to following appropriate design and protocol rules and providing a low cost, commercially viable solution.

A particular function that these network devices often perform is filtering the data that pass through the network devices. Such filtering of packets can be either static or dynamic and can examine a packet header to determine attributes of the packet, such as its source or destination, or examine other portions of the packet. Some network devices, in particular, have fast filtering processors that are independent of any central processing unit connected to the network device. Because of the independence of such a fast filtering processor, linespeed processing is more easily achieved and the functions of the processor can be tailored to the filtering functions required than could a central processing unit.

Many such filtering systems are similar to the filtering processes described in U.S. Pat. No. 6,335,935, which is hereby incorporated by reference, that provide filtering results. Additionally, these systems are often implemented using large, fixed size masks that are applied to portions of the packets. The application of the masks allows for fields of the packet fields to be extracted and the processor determines if extracted fields match configured values so that a proper action can be implemented. Additionally, filtering may also include management of flows through the network device and allow for the specific handling of certain data based on fields within the packet. These fields contain data about the source, destination, protocol and other properties of the packet. Classification of flows of flows of incoming packets on an ingress port of a network device is critical to providing differentiated services to different types of traffic flows.

However, these fast filtering processors require that a significant portion of the network device be utilized in the filtering process. The filtering processes are generally not expandable, often take a great number of cycles to process and increase the latency periods for address resolution lookup (ARL) and ingress processes. Given that the number of masks that can be applied is generally limited, the number of functions that a fast filtering processor can perform is also limited.

As such, there is a need for an efficient filtering method and a scalable filtering mechanism for data passing through network devices. There is also a need for filtering mechanisms that are more flexible and allows filtering masks to be reserved for classification of packets, especially where the extracted fields need to be extracted independent of the values of those fields. Also, there is a need for a powerful, flexible method of extracting relatively small fields from a datagram, where the extraction of the next field is optionally based on the value of the previous field, is described.

SUMMARY OF THE INVENTION

It is an object of this invention to overcome the drawbacks of the above-described conventional network devices and methods. The present invention provides for a multilevel parser for conditional flow detection. The present invention provides for a powerful, flexible method of extracting relatively small fields from a packet, where the extraction of the next field is optionally based on the value of the previous field, is described.

According to one aspect of this invention, a process of filtering packet data in a network device is disclosed. A descriptor table is accessed to obtain a first descriptor and a first field is extracted from a packet based on the first descriptor. An action table is accessed based on a value of the first field of the packet. Then an action from the action table is executed when a valid bit from the action table for the action is set or an action from a miss action table is executed when a valid bit from the action table for the action is not set.

Alternatively, a first descriptor and an offset may be obtained from the descriptor table and a first field from a packet may be extracted by accessing a section of the packet set by the first descriptor and offset by the offset. Also, wherein the process may be performed for each row of the descriptor table. In addition, the extracted first field may come from the packet header of the packet based on the first descriptor. Also, the method may be included in the handling of data packets in a network device, where a packet is received at a port interface and at least one portion of the packet is read. Next, the filtering would be performed according to the method described above and the packet may be discarded, forwarded, or modified based upon the filtering process.

Also, the process may include checking a mode associated with the first descriptor and taking a next step based on that mode. That next step may be indexing into the action table based on the value of the first field of the packet. Or, the next step may be hashing into a value table using the value of the first field of the packet and then obtaining an action table index from the value table for use with the action table. Also, the next step may include hashing into a value table using the value of the first field of the packet, obtaining a second descriptor field index from the value table, indexing into a second descriptor table using the second descriptor field index to obtain a second descriptor, extracting a second field from the packet based on the second descriptor and accessing the action table using a value of the second field as an index into the action table. In addition, the next step may be indexing into a second descriptor table based on the value of the first field to obtain a second descriptor, extracting a second field from the packet based on the second descriptor, hashing into a value table using the value of the second field of the packet, and obtaining an action table index from the value table for use with the action table.

According to another aspect of this invention, a packet filter for a network device is disclosed. The filter includes first accessing means for accessing a descriptor table to obtain a first descriptor and first extracting means for extracting a first field from a packet based on the first descriptor. The filter also includes second accessing means for accessing an action table based on a value of the first field of the packet and second extracting means for executing an action from the action table when a valid bit from the action table for the action is set. Also, the filter includes executing means for executing an action from the action table when a valid bit from the action table for the action is set.

In another embodiment, a packet filter for a network device includes a first retriever for accessing a descriptor table to obtain a first descriptor. The filter also includes a first extractor for extracting a first field from a packet based on the first descriptor and a second retriever means for accessing an action table based on a value of the first field of the packet. Additionally, the filter includes a first executor for executing an action from the action table when a valid bit from the action table for the action is set and a second executor for executing a miss action from a miss action table when a valid bit from the action table for the action is not set.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

Figure 1:
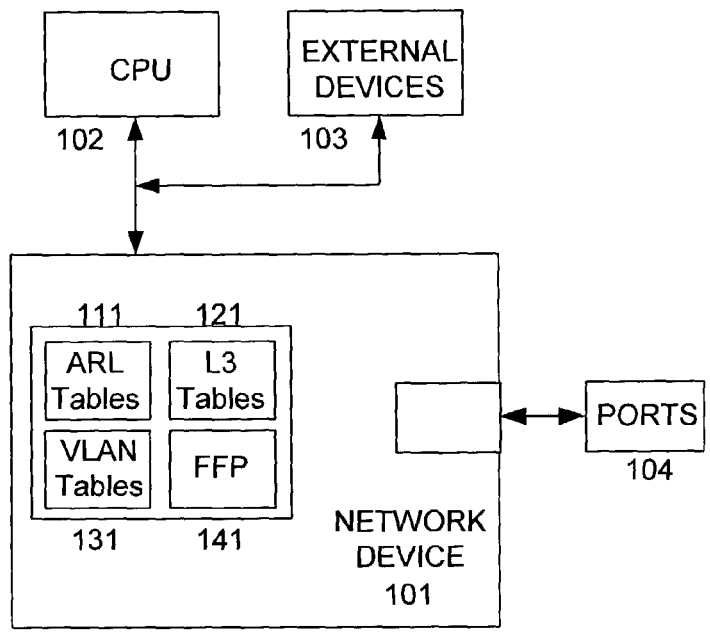
FIG. 1 is a general block diagram of elements of an example of a network device according to one embodiment of the present invention.

FIG. 1 illustrates a configuration of a node of the network, in accordance with the present invention. The network device 101 can be connected to a Central Processing Unit (CPU) 102 and other external devices 103. The CPU can be used as necessary to program the network device 101 with rules that are appropriate to control packet processing. Ideally, the network 101 device should be able to process data received through physical ports 104 with only minimal interaction with the CPU and operate, as much as possible, in a free running manner. The network device 101 utilizes tables of data to determine the proper processing and routing of an incoming packet. These lookup tables include Address Resolution Logic (ARL) tables 111, Layer 3 (L3) tables 121, and Virtual Local Area Network (VLAN) tables 131. The Fast Filtering Processor (FFP) 141, as discussed above, provides filtering of data packets.

When the packet comes in from the ingress port the decision to accept the frame for learning and forwarding is done based on several ingress rules. These ingress rules are based on the Protocols and Filtering Mechanisms supported in the switch. The protocols which decide these rules could include, for example, IEEE 802.1d (Spanning Tree Protocol), 802.1p and 802.1q. Extensive Filtering Mechanism with inclusive and exclusive Filters is supported. These Filters are applied on the ingress side, and depending on the filtering result, different actions are taken. Some of the actions may involve changing the 802.1p priority in the packet Tag header, changing the Type Of Service (TOS) Precedence field in the IP Header or changing the egress port.

Figure 2:
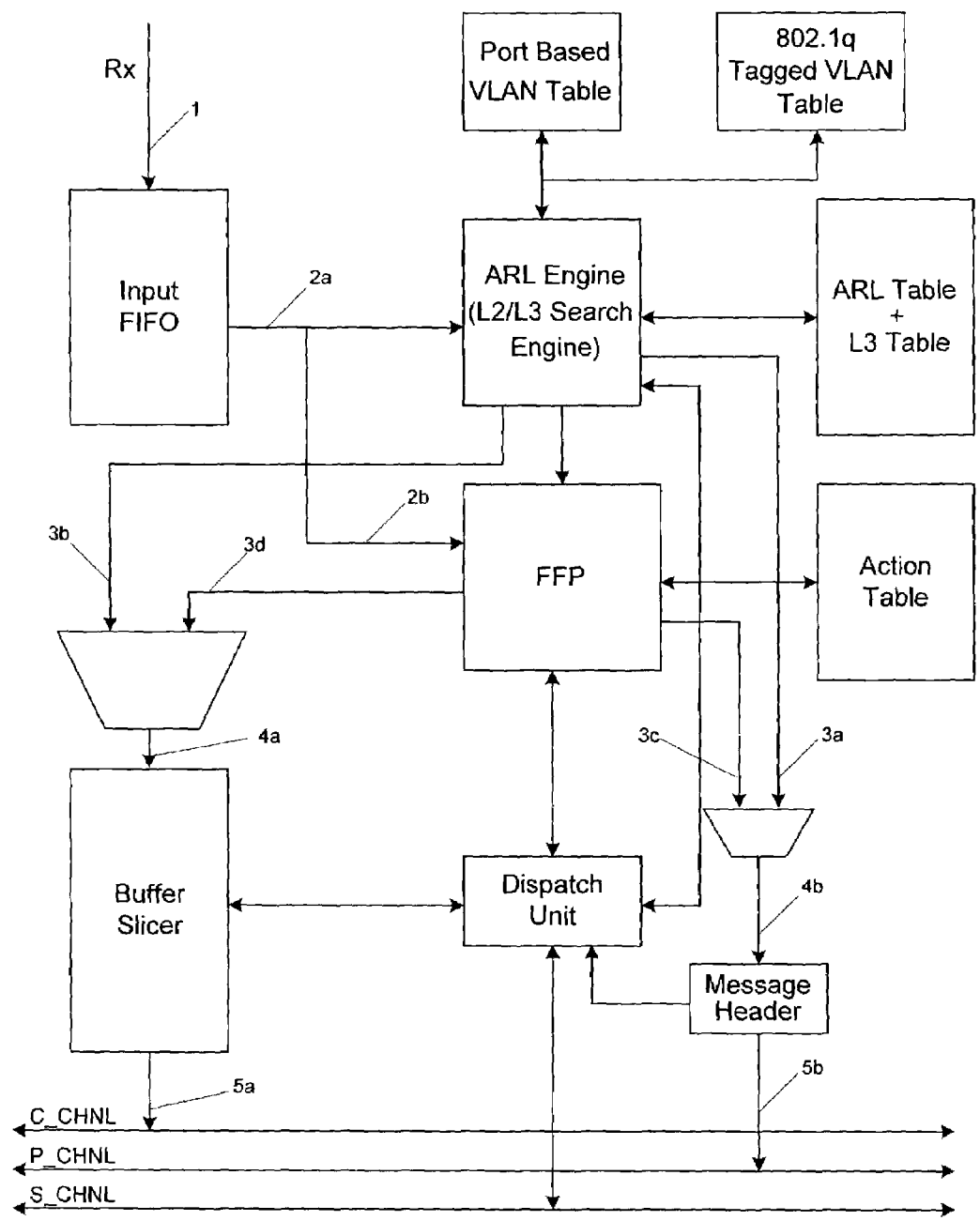
FIG. 2 is a data flow diagram for a packet on ingress to the network device.

The data flow on the ingress into the switch will now be discussed with respect to FIG. 2. As the packet comes in, it is put in the Input FIFO, as shown in step 1. An Address Resolution Request is sent to the ARL Engine as soon as first 16 bytes arrive in the Input FIFO at 2*a*. If the packet has 802.1q Tag then the ARL Engine does the lookup based on 802.1q Tag in the TAG BASED VLAN TABLE. If the packet does not contain 802.1q Tag then ARL Engine gets the VLAN based on the ingress port from the PORT BASED VLAN TABLE. Once the VLAN is identified for the incoming packet, ARL Engine does the ARL Table search based on Source Mac Address and Destination Mac Address. The key used in this search is Mac Address and VLAN ID. If the result of the ARL search is one of the L3 Interface Mac Address, then it does the L3 search to get the Route Entry. If an L3 search is successful then it modifies the packet as per Packet Routing Rules.

At step 2*b*, a Filtering Request is sent to Fast Filtering Processor (FFP) as soon as first 64 bytes arrive in the Input FIFO. The outcome of the ARL search, step 3*a*, is the egress port/ports, the Class Of Service (COS), Untagged Port Bitmap and also in step 3*b* the modified packet in terms of Tag Header, or L3 header and L2 Header as per Routing Rules. The FFP applies all the configured Filters and results are obtained from the ACTION TABLE.

The output of the Filtering Logic, at 3*c*, determines if the packet has to be discarded, sent to the CPU or, in 3*d*, the packet has to be modified in terms of 802.1q header or the TOS Precedence field in the IP Header. If the TOS Precedence field is modified in the IP Header then the IP Checksum needs to be recalculated and modified in the IP Header.

The outcome of FFP and ARL Engine, in 4*a*, are applied to modify the packet in the Buffer Slicer. Based on the outcome of ARL Engine and FFP, 4*b*, the Message Header is formed ready to go on the Protocol Channel. The Dispatch Unit sends the modified packet over the cell Channel, in 5a, and at the same time, in 5b, sends the control Message on the Protocol Channel. The Control Message contains the information such as source port number, COS, Flags, Time Stamp and the bitmap of all the ports on which the packet should go out and Untagged Bitmap.

In the present invention, a powerful, flexible method of extracting relatively small fields from a packet is disclosed, where the extraction of the next field is optionally based on the value of the previous field, is described. Using the method in this disclosure, a large number of large FFP masks are preserved for other more appropriate classification purposes. The FFP mask and rules can be typically used where a set of fields of the packet are extracted independent of the values of the fields in the incoming packet.

In this embodiment of the present invention, a field is extracted from the packet header as specified by a descriptor. The value of the first field can be used to index, with an offset, into an Action table or hash into a table of values with indices into the action table. Optionally, the value of the first field identifies the descriptor to be used to extract the second field of the packet. The value of the second field of the packet can be used to directly index with an offset into the Action table or hash into a table of values mapping to actions or index into another rule to extract the next field of interest, resulting in a chained set of rules. In case a rule does not match, the miss action associated with a rule is executed.

The following tables may be stored in each ingress block and are used to provide the filtering functions. One such table is an F1 table and the entries of the F1 table, according to one embodiment, are provided below:

TABLE 1

| {Index, # bits} (8-bit, 5-bit) | Offset (8-bit) | Mode (2-bit) 00: Index into Value table = F1 + Offset 01: Hash F1 value into Value table 10: Index into F2 table = F1 + Offset 11: Hash F1 value into F2 table | Miss Action (Index into Miss action table) (4-bit) |
|---|---|---|---|
| {12, 5} | 10 | | |

The F1 table is where the extraction process starts. Each row of the table is a rule specification for the extraction of the first field (F1) from the packet header and actions based on the value of the field obtained from the packet. The first column describes F1 by specifying the bit position and the number of bits of the packet to be extracted. The second column describes the offset into the Action or F2 table.

The third column of the F1 table is the mode, which specifies how the value of F1 will be used. When the mode equals 00, the value of F1 is used to index into the Action table. The offset value programmed in the second column is added to the F1 value. When the mode equals 01, the value of F1 is hashed into the Values table using a hash algorithm, such as a 32 bit Cyclic Redundancy Check (CRC-32) hash algorithm. When the mode equals 10, the value of F1 is used to index into the F2 table. The offset value is added to the F1 value. A reserved mode is also included, i.e. Mode equal to 11, for future expansion.

The fourth column of the F1 table is the index into the miss action table. This is used when the value of F1 is used to offset index in the Action table and the entry in the Action table has the valid bit equal to 0 and when the value of F1 is used to hash into the Values table and there is a miss. That is, no valid matching value is found in the Values table. Only entries in the hash table with the valid bit equal to 1 are compared with the key being searched.

Another table used in the filtering process is the F2 table, where the table has entries, according to one embodiment, as provided below:

TABLE 2

| Field 2 descriptor {Index, #bits} (8-bit, 5-bit) | Offset (8-bit) | Mode (1-bit) 0: Direct Index = F2 + Offset 1: Hash F2 value into Value table | Miss Action (Index into Miss action table) (4-bit) |
|---|---|---|---|
| {12, 5} | 10 | | |

The F2 table is used by optionally setting the appropriate mode of operation in the F1 table. This table has the second level field (F2) extraction descriptor. Each row of the table specifies a rule which takes on meanings based on the setting of the Mode column. The first column describes F2 by specifying the bit position and the number of bits of the packet to be extracted. The second column describes the offset into the Action table.

The third column of the F2 table is the mode, which specifies how the value of F2 will be used. When the mode is equal to 0, the value of F2 is used to index into the Action table. The offset value programmed in the second column is added to the F2 value. When the mode is equal to 1, the value of F2 is hashed into the Values table using a hash algorithm, such as the CRC-32 hash algorithm. The fourth column is the index into the miss action table. This is used when the value of F2 is used to offset index in the Action table and the entry in the Action table has the valid bit equal to 0 and when the value of F2 is used to hash into the values table and there is a miss.

Another table used to provide the filtering is the Values table. The table has entries, according to one embodiment, as provided below:

TABLE 3

| Values bucket (2 * 32-bit) OR (4 * 16-bit) | Valid (1-bit) | Action/F2 Index (13-bit) |
|---|---|---|
| 129 | 1 | 0 |
|  | 0 |  |
| 79 | 1 | 1 |
|  | 0 |  |

This table contains the values which are looked up if the F1 key or the F2 key is used to hash into this table. The key used to search this table has the following structure:

TABLE 4

| Table Number | Row Number | F1 or F2 Value |
|---|---|---|

The first column of the Values table contains a 64-bit bucket. This bucket is either used as a bucket with 2, 32-bit values or a bucket of 4, 16-bit values. This is determined by Values table hash mode configuration bit. The second column is a valid bit used to indicate whether the column 1 entry is valid or not. The third column is an index into the Action table OR into the F2 table. If the Most Significant Bit (MSB) of the index is 1, the F2 table is indexed, else the index is into the Action table.

The Action table has a format as provided below:

TABLE 5

| Valid (1-bit) | Actions | |
|---|---|---|
| 1 | Type | Meter ID |
| 1 | Type | Meter ID |
| 0 | Type | Other 1 |
| 0 | Type | Other 2 |

This Action table contains the actions to be performed if there is a matching rule. A rule match is detected if a hash into the values table is a hit or if the valid bit is set for the entry in the action table being indexed.

Similarly, a Miss Action table is provided as presented below:

TABLE 6

| Miss Actions | |
|---|---|
| Type | Meter ID |
| Type | Meter ID |
| Type | Other 1 |
| Type | Other 2 |

This table contains the actions to be performed when fields extracted from a packet fail to match values for a rule. This column table used by both the F1 and the F2 tables.

Figure 3:
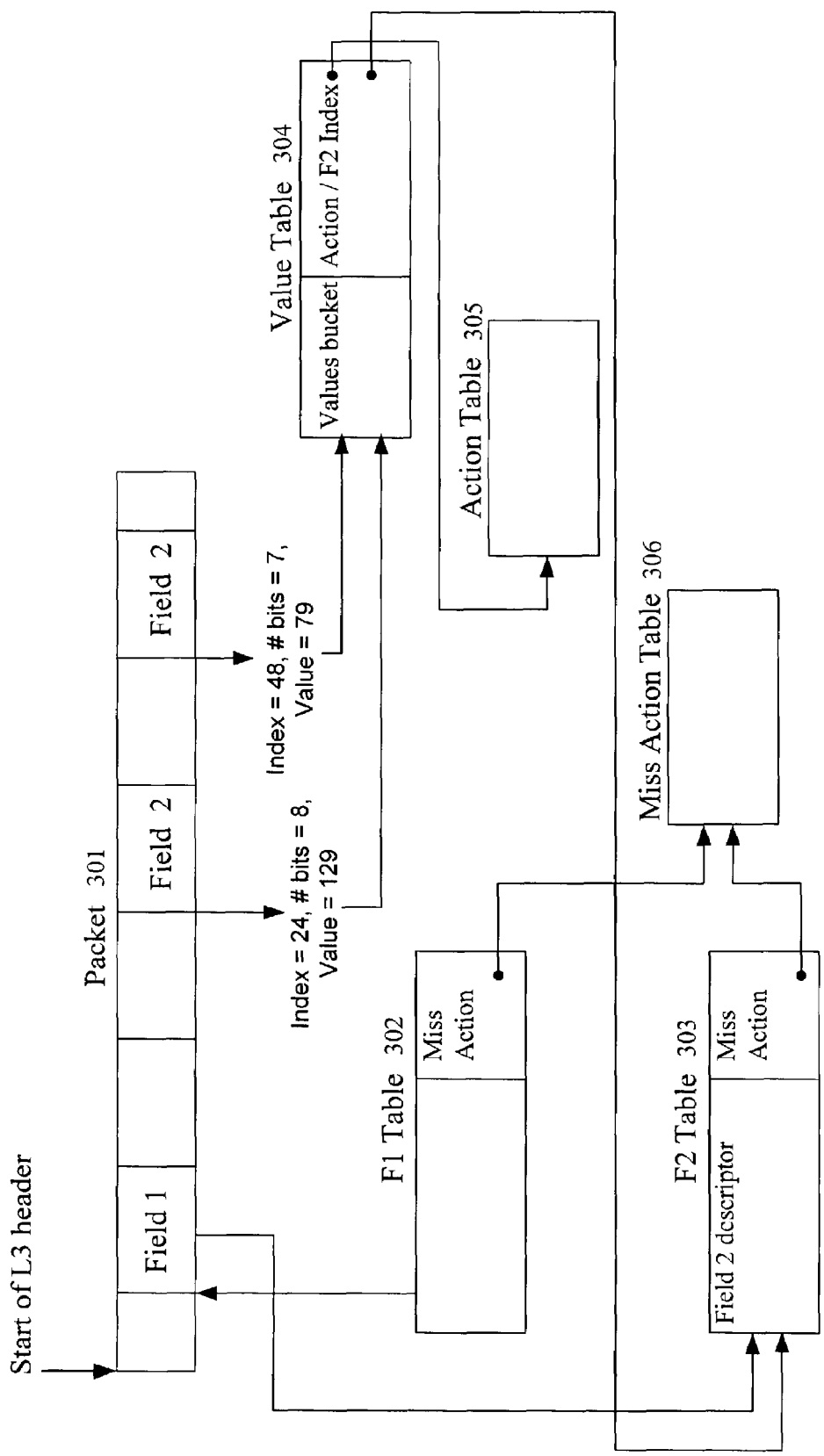
FIG. 3 is a schematic illustrating the operation of the conditional parser, according to one embodiment of the present invention.

The overall function of the filtering process is illustrated in FIG. 3. A portion of the packet 301 is received and the start of the L3 header is determined. The F1 table 302 is accessed and an index and an offset are obtained. The mode is also obtained from the F1 table. Based on the index and the offset, Field 1 is obtained. In FIG. 3, the value of Field 1 is used to extract Field 2 from the packet using the F2 table 303. Field 2 can be used to hash into the Value table 304, either to obtain another index for the F2 table or to obtain a mapping into the Action table 305. If a rule fails to match, a miss action from the Miss Action table 306 is executed. It is noted that the number of bits in the fields for direct index and offsets should be programmed such that the Value table size is not exceeded.

The conditional parser described above is generic enough to be used to classify fields in any part of the packet. However, in a typical application, it may be used to operate on fields starting from the L3 header of the packet. The following is the sequence of operations to parse a packet using this method. These operations can be executed in parallel where appropriate. Each row of the F1 table represents the start of a rule. The processing starts by examining a row of the F1 table. In a typical implementation the rules can be examined in parallel.

As an example, the parsing may be carried out according to the pseudo code provided below:

```
START:
    For each row (rule) of the F1 table {
        Extract F1 from the packet header using F1 descriptor
        Check rule mode
        Switch (mode) {
            Case 00:
                if (actionTable[F1 + Offset].valid == 1) {
                    Execute Action from actionTable[Index = F1 + Offset]
                }
                else {
                    Execute Miss action from missActionTable[Index = F1Table[row#].missActionIndex]
                }
            Case 01:
                if (CRC32_hash(valueTable, {Table#, Row#, F1)) == HIT) {
                    if (index == actionIndex) { // MSB of the index = 0
                        Execute Action from actionTable[valueTable[HIT index].actionIndex]
                    }
                    else { // index == F2Index (MSB of the index = 1)
                        processF2Table(valueTable[HIT index].F2Index);
                    }
                }
                else {
                    Execute Miss action from missActionTable[Index = F1Table[row#].missActionIndex]
                }
            case 10:
                processF2Table(F1 + Offset);
            case 11:
                //Reserved case - Error
        } /* Switch */
    } /* For each */
END:
processF2Table(Row #) {
    Extract F2 from the packet header using F2 descriptor
    Check rule mode
    switch (mode) {
```

```
        case 0:
            if (actionTable[F2 + Offset].Valid == 1) {
                Execute Action from actionTable[Index = F2 + Offset]
            }
            else {
                Execute Miss action from missActionTable[Index =
F2Table[row#].missActionIndex]
            }
        case 1:
            if (CRC_hash(valueTable, {Table#, Row#, F2}) == HIT) {
                if (index == actionIndex) {
                    Execute Action from actionTable[valueTable[HIT
index].actionIndex]
                }
                else { // index == F2Index
                    processF2Table(valueTable[HIT index].F2Index);
                }
            }
            else {
                Execute Miss action from missActionTable[Index =
F2Table[row#].missActionIndex]
            }
    } // switch
}
```

Other configurations are also possible; the above pseudo code is by way of example only.

To illustrate the abilities of the parser processes and structure described above, the following examples are discussed. One such example is the direct indexing of the F1 table. Using this rule, a single field of the packet header is extracted. The value of the field plus offset is used to index into the Action table where the action associated with the rule is stored. The action is executed if the valid bit is set. If the valid bit is 0, the miss action associated with the rule is executed.

Another example is an F1 Hash example. Only the first field of the packet header is extracted. The value of the field is used to hash into the Value table. If there is a hit (valid value exists in the hash table), the action indexed by the table index is executed if the index is an action table index (MSB on the index field is equal to 0). If there is a miss, the miss action associated with the rule is executed.

Additionally, F1 hash and F2 direct index example is discussed. The first field of the packet header is extracted. The value of the field is used to hash into the Value table. If there is a hit, the index field in the value table determines the next step. The index will be programmed to be an index into the F2 table (MSB equal to 1). The F2 rule is executed. The second field is executed from the packet and the value of this field plus offset is used to index into the Action table. If the action table valid bit equals 1, the action is executed. If there is a miss (valid equal to 0), the miss action associated with the rule is executed.

Additionally, F1 direct index and F2 hash example is discussed. The first field of the packet header is extracted. The value of the field plus offset is used to index into the F2 table. The F2 rule is executed. The second field is extracted from the packet and the value of this field is used to hash into the Value table. If there is a hit, the action indexed by the table index is executed (the index is programmed to be an action table index (MSB equal to 0)). If there is a miss (valid equal to 0), the miss action associated with the rule is executed.

Figure 4:
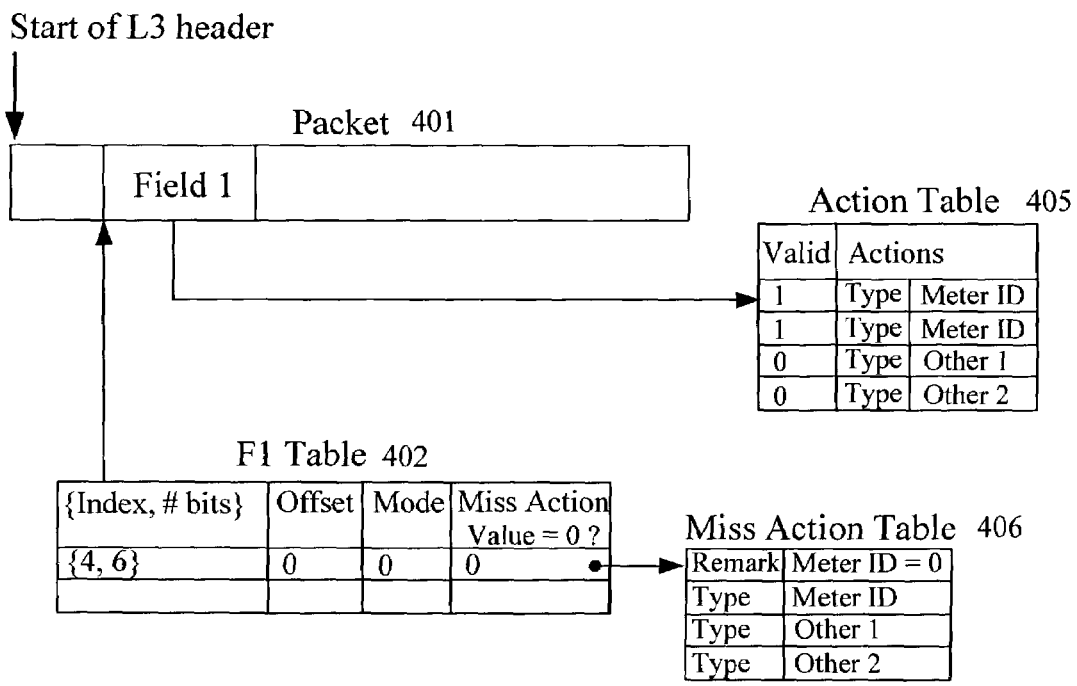
FIG. 4 is an example of use of the multilevel parser to match Differentiated Services Code Point (DSCP) code points, according to one embodiment of the present invention.
Figure 5:
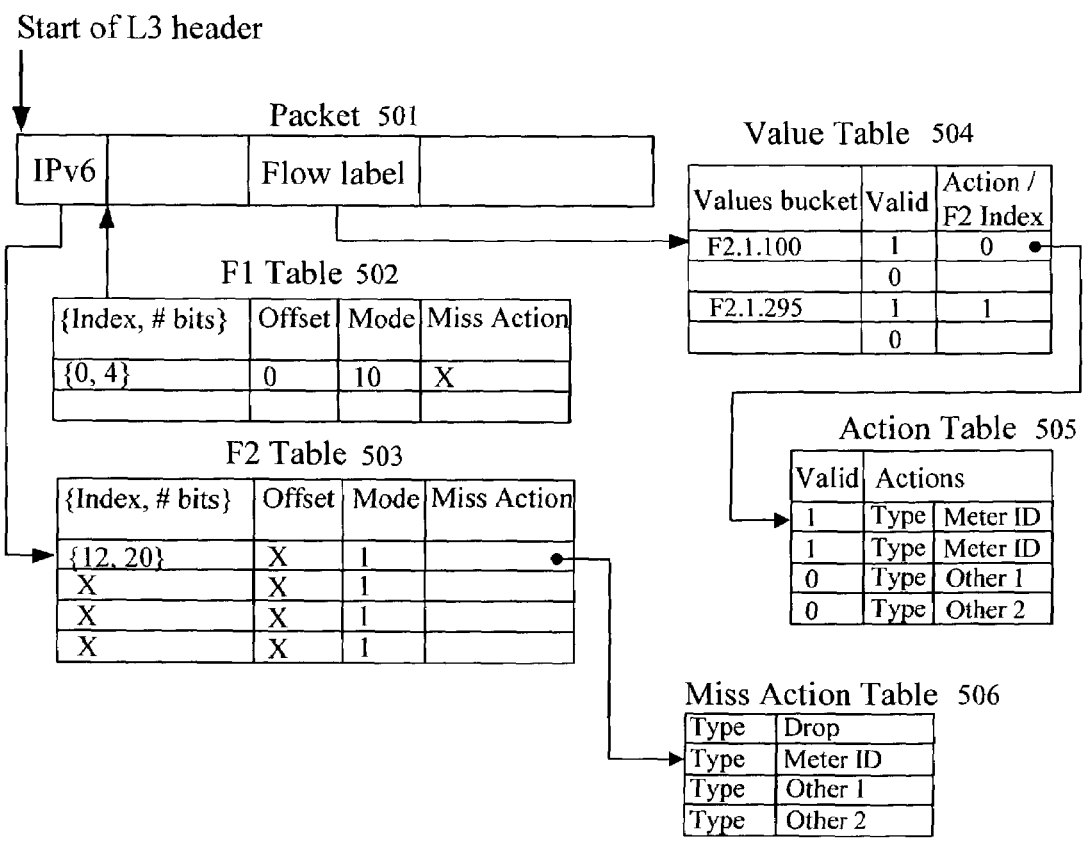
FIG. 5 is an example of use of the multilevel parser to match Internet Protocol (IP) version and a flow label, according to one embodiment of the present invention.

Also, examples of specific filtering for specific fields are also discussed. In one example, illustrated in FIG. 4, a F1 direct rule described above, filtering is used to perform actions on packets belonging to flows identified by the Differentiated Services Code Point (DSCP) in the packet IP header. To offer differentiated services, a service provider must classify network traffic and assign priorities to it based on customer requirements and the associated fees they are willing to pay. DSCP is a part of the Differentiated Services (DiffServ) framework specified by the Internet Engineering Task Force (IETF) in RFC 2474. DSCP is a six-bit field in an IP packet header from which as many as 64 classes of service can be created. DSCP and related, DiffServ-compliant quality-of-service (QoS) mechanisms enable service providers to allocate resources such as bandwidth on a packet-by-packet basis to meet customer requirements. In this example, the F1 table 402 provides the field position of the DSCP within the packet 401 and the field value is used to index into the Action table 405. If there is a miss, i.e. the valid bit of the Action table is 0, then a miss action obtained from the Miss Action table 406 executed.

In another example, the F1 direct and F2 hash mode described above is used to detect a flow (identified by the flow label) if the packet 501 is an IPv6 packet. The F1 table 502 is accessed and the IPv6 field is extracted. The value of this field and an offset is used to index into the F2 table 503. This provides the field 2 descriptor, in this case the flow label for the packet. The flow label is used to hash into the Value table 504. If there is a hit, then an indexed action of the Action table 505 is executed. If there is a miss, then the miss action associated with the rule, obtained from the Miss Action table 506, is executed.

Figure 6:
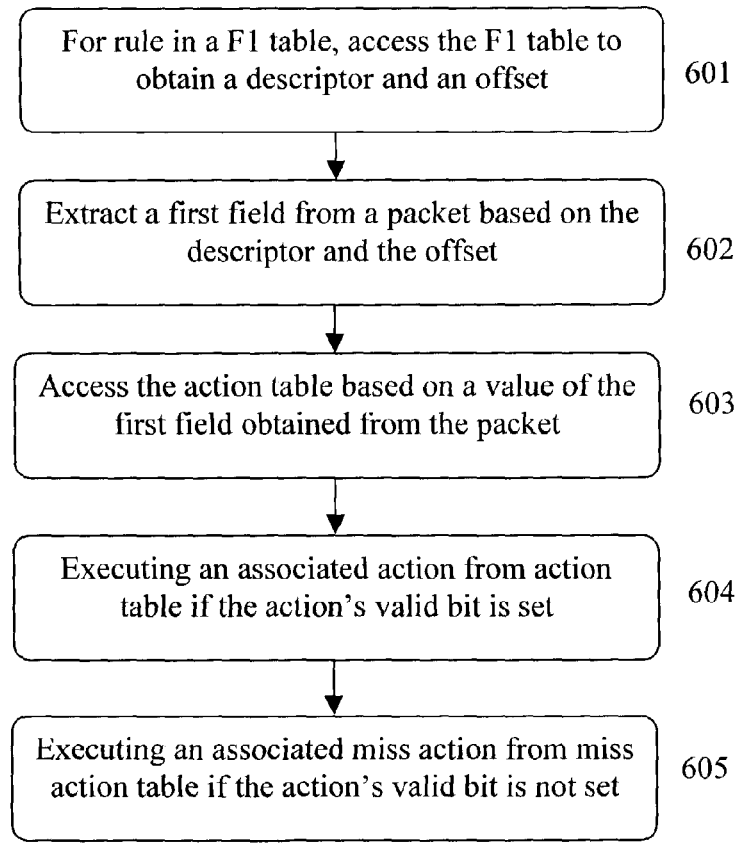
FIG. 6 is a flow chart illustrating the processes carried out by the parser, according to one embodiment of the present invention.

The general processes carried out by the parser of the filtering mechanism are illustrated in FIG. 6. In rule 601, for each rule or row of the F1 table, the F1 table is accessed to obtain a descriptor and an offset. The descriptor and the offset are applied to a portion of the packet, in step 602, to extract a first field. Next, in step 603, an Action table is accessed based on the value of the first field. An associated action from the Action table is executed when the action's valid bit is set, step 604, or an associated miss action from a miss action table is executed when the action's valid bit is not set, step 605.

The present invention provides for an optimal, flexible mechanism for parsing and filtering a packet. The present invention detects flows using multiple fields extracted from the packet header. Based on the value of the first extracted field, the second field may be defined and extracted. The action corresponding to the value of the second field is executed. Action can be chained so that multiple fields are extracted and examined before an action programmed in the Action table is executed. The widths of fields extracted can be small resulting in savings in die size.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

In addition, while the term packet has been used in the description of the present invention, the invention has import to many types of network data. For purposes of this invention, the term packet includes packet, cell, frame, datagram, bridge protocol data unit packet, and packet data.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A process of filtering packet data in a network device, said process comprising:
   accessing a descriptor table to obtain a first descriptor;
   extracting a first field from a packet based on the first descriptor, wherein the first field is used to identify the descriptor to be used to extract a second field of the packet;
   accessing an action table based on a value of the first field of the packet;
   executing an action from said action table when a valid bit from said action table for said action is set; and
   executing a miss action from a miss action table when a valid bit from said action table for said action is not set.

2. A process as recited in claim 1, wherein said step of accessing a descriptor table to obtain a first descriptor comprises accessing a descriptor table to obtain a first descriptor and an offset and said step of extracting a first field from a packet based on the first descriptor comprises extracting a first field from a packet by accessing a section of the packet set by the first descriptor and offset by the offset.

3. A process as recited in claim 1, wherein said process is performed for each row of the descriptor table.

4. A process as recited in claim 1, wherein said step of extracting a first field from a packet based on the first descriptor comprises extracting a first field from a packet header of the packet based on the first descriptor.

5. A process as recited in claim 1, further comprising:
   checking a mode associated with said first descriptor; and
   determining at least one next step based on said mode.

6. A process as recited in claim 5, wherein said at least one next step comprising:
   indexing into the action table based on said value of said first field of the packet.

7. A process as recited in claim 5, wherein said at least one next step comprising:
   hashing into a value table using said value of said first field of the packet; and
   obtaining an action table index from said value table for use with the action table.

8. A process as recited in claim 5, wherein said at least one next step comprising:
   hashing into a value table using said value of said first field of the packet;
   obtaining a second descriptor field index from said value table;
   indexing into a second descriptor table using the second descriptor field index to obtain a second descriptor;
   extracting a second field from the packet based on the second descriptor; and
   accessing said action table using a value of said second field as an index into said action table.

9. A process as recited in claim 5, wherein said at least one next step comprising:
   indexing into a second descriptor table based on said value of said first field to obtain a second descriptor;
   extracting a second field from the packet based on the second descriptor
   hashing into a value table using said value of said second field of the packet; and
   obtaining an action table index from said value table for use with the action table.

10. A method of handling data packets in a network device, said method comprising:
    receiving a packet at a port interface;
    reading at least one portion of said packet;
    filtering said at least one portion according to the filtering process recited in claim 1; and
    discarding, forwarding, or modifying the packet based upon the filtering process.

11. A packet filter for a network device, said filter comprising:
    first accessing means for accessing a descriptor table to obtain a first descriptor;
    first extracting means for extracting a first field from a packet based on the first descriptor and for identifying the descriptor to be used to extract a second field of the packet;
    second accessing means for accessing an action table based on a value of the first field of the packet;
    first executing means for executing an action from said action table when a valid bit from said action table for said action is set; and
    second executing means for executing a miss action from a miss action table when a valid bit from said action table for said action is not set.

12. A packet filter for a network device as recited in claim 11, wherein said first accessing means comprises third accessing means for accessing a descriptor table to obtain a first descriptor and an offset and said first extracting means comprises third extracting means for extracting a first field from a packet by accessing a section of the packet set by the first descriptor and offset by the offset.

13. A packet filter for a network device as recited in claim 11, wherein said first accessing means is configured to access each row of the descriptor table.

14. A packet filter for a network device as recited in claim 11, wherein said first extracting means comprises third extracting means for extracting a first field from a packet header of the packet based on the first descriptor.

15. A packet filter for a network device as recited in claim 11, further comprising:
checking means for checking a mode associated with said first descriptor; and
determining means for determining what additional elements of the packet filter are utilized based on said mode.

16. A packet filter for a network device as recited in claim 15, wherein said filter further comprises:
indexing means for indexing into the action table based on said value of said first field of the packet.

17. A packet filter for a network device as recited in claim 15, wherein said filter further comprises:
hashing means for hashing into a value table using said value of said first field of the packet; and
obtaining means for obtaining an action table index from said value table for use with the action table.

18. A packet filter for a network device as recited in claim 15, wherein said filter further comprises:
hashing means for hashing into a value table using said value of said first field of the packet;
obtaining means for obtaining a second descriptor field index from said value table;
indexing means for indexing into a second descriptor table using the second descriptor field index to obtain a second descriptor;
extracting means for extracting a second field from the packet based on the second descriptor; and
third accessing means for accessing said action table using a value of said second field as an index into said action table.

19. A packet filter for a network device as recited in claim 15, wherein said filter further comprises:
indexing means for indexing into a second descriptor table based on said value of said first field to obtain a second descriptor;
extracting means for extracting a second field from the packet based on the second descriptor
hashing means for hashing into a value table using said value of said second field of the packet; and
obtaining means for obtaining an action table index from said value table for use with the action table.

20. A network device, said device comprising:
receiving means for receiving a packet at a port interface;
reading means for reading at least one portion of said packet;
a packet filter as recited in claim 11; and
means for discarding, forwarding, or modifying the packet based upon a result from the packet filter.

21. A packet filter for a network device, said filter comprising:
a first retriever for accessing a descriptor table to obtain a first descriptor;
a first extractor for extracting a first field from a packet based on the first descriptor and for identifying the descriptor to be used to extract a second field of the packet;
a second retriever means for accessing an action table based on a value of the first field of the packet;
a first executor for executing an action from said action table when a valid bit from said action table for said action is set; and
a second executor for executing a miss action from a miss action table when a valid bit from said action table for said action is not set.

22. A packet filter for a network device as recited in claim 21, wherein said first retriever comprises a third retriever for accessing a descriptor table to obtain a first descriptor and an offset and said first extractor comprises a third extractor for extracting a first field from a packet by accessing a section of the packet set by the first descriptor and offset by the offset.

23. A packet filter for a network device as recited in claim 21, wherein said first retriever is configured to access each row of the descriptor table.

24. A packet filter for a network device as recited in claim 21, wherein said first extractor comprises a third extractor for extracting a first field from a packet header of the packet based on the first descriptor.

25. A packet filter for a network device as recited in claim 21, further comprising:
a checker for checking a mode associated with said first descriptor; and
a chooser for determining what additional elements of the packet filter are utilized based on said mode.

26. A packet filter for a network device as recited in claim 25, wherein said filter further comprises:
an indexer for indexing into the action table based on said value of said first field of the packet.

27. A packet filter for a network device as recited in claim 25, wherein said filter further comprises:
a hashing retriever for hashing into a value table using said value of said first field of the packet; and
a selector for obtaining an action table index from said value table for use with the action table.

28. A packet filter for a network device as recited in claim 25, wherein said filter further comprises:
a hashing retriever for hashing into a value table using said value of said first field of the packet;
a selector for obtaining a second descriptor field index from said value table;
an indexer for indexing into a second descriptor table using the second descriptor field index to obtain a second descriptor;
an extractor for extracting a second field from the packet based on the second descriptor; and
a third retriever for accessing said action table using a value of said second field as an index into said action table.

29. A packet filter for a network device as recited in claim 25, wherein said filter further comprises:
an indexer for indexing into a second descriptor table based on said value of said first field to obtain a second descriptor;
an extractor for extracting a second field from the packet based on the second descriptor
a hashing retriever for hashing into a value table using said value of said second field of the packet; and
a selector for obtaining an action table index from said value table for use with the action table.

30. A network device, said device comprising:
a receiver for receiving a packet at a port interface;
a reader for reading at least one portion of said packet;
a packet filter as recited in claim 21; and
a decider for discarding, forwarding, or modifying the packet based upon a result from the packet filter.

* * * * *